No. 878,522.　　　　　　　　　　　　　　　PATENTED FEB. 11, 1908.
F. L. GORMLEY.
LIFTING JACK.
APPLICATION FILED SEPT. 19, 1907.

Witnesses.
C. H. Garnett.
J. Murphy.

Inventor:
Frank L. Gormley
by Jas. H. Churchill
Atty.

UNITED STATES PATENT OFFICE.

FRANK L. GORMLEY, OF BOSTON, MASSACHUSETTS, ASSIGNOR TO A. O. NORTON INCORPORATED, OF BOSTON, MASSACHUSETTS, A CORPORATION.

LIFTING-JACK.

No. 878,522.  Specification of Letters Patent.  Patented Feb. 11, 1908.

Application filed September 19, 1907. Serial No. 393,656.

*To all whom it may concern:*

Be it known that I, FRANK L. GORMLEY, a subject of the King of Great Britain, but now residing in Boston, in the county of Suffolk and State of Massachusetts, have invented an Improvement in Lifting-Jacks, of which the following description, in connection with the accompanying drawings, is a specification, like letters on the drawings representing like parts.

This invention relates to devices provided with a screw and a threaded socket in which the screw moves, and is herein shown as embodied in a lifting-jack.
The invention has for its object to provide for taking up the wear on the screw and on the threads of the socket, whereby the life and usefulness of the jack or other device may be materially prolonged, and loss of time in using the jack or other device may be avoided. For this purpose I employ a sleeve or nut, which is provided with internal screw-threads to engage the threads of the screw, and with tapering external screw-threads, which coöperate with tapering internal screw-threads on a socket-piece, said sleeve or nut having one or more slits or slots extending longitudinally thereof, to permit the internal diameter of the sleeve or nut to be made smaller by the movement of the nut or sleeve into its tapered socket piece. Provision is made for regulating the contraction of the internal diameter of the sleeve or nut to avoid binding of the same on the screw.
These and other features of this invention will be pointed out in the claims at the end of this specification.

Figure 1:
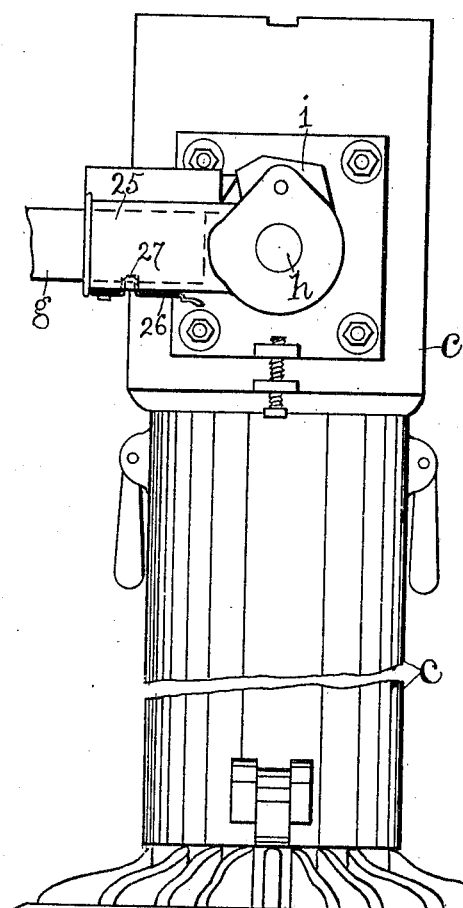
Figure 2:
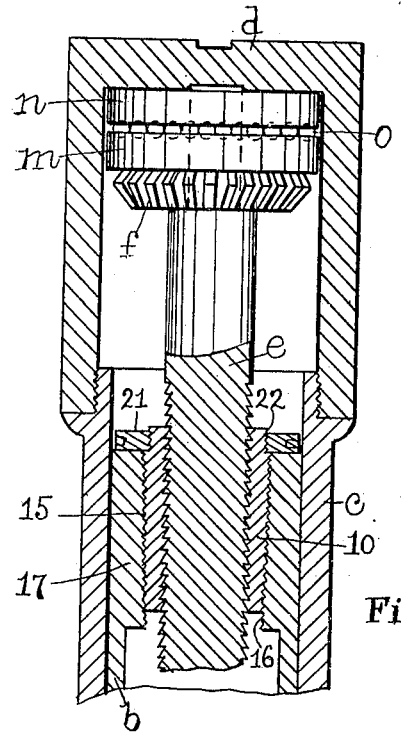
Figure 3:
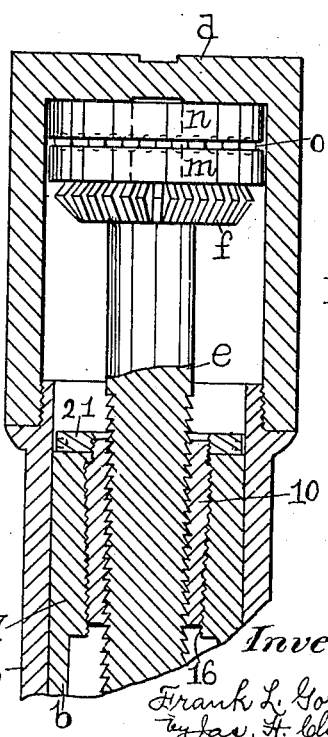
Figure 4:
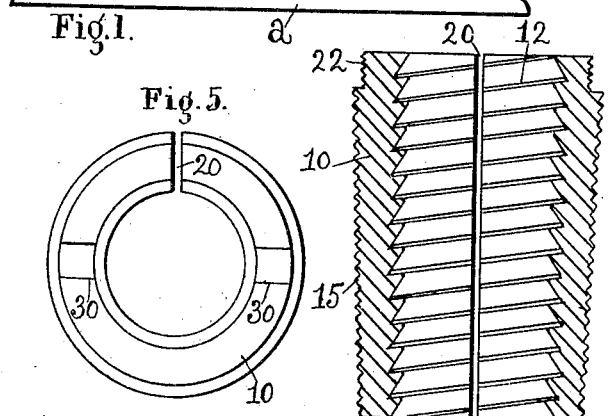
Figure 5:
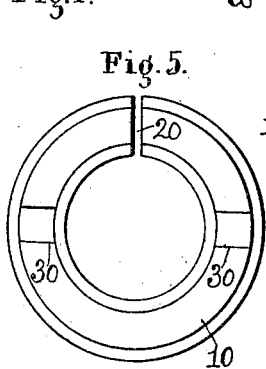

Figure 1 is a side elevation of a lifting-jack embodying this invention. Figs. 2 and 3, enlarged details in section of the upper portion of the jack shown in Fig. 1. Fig. 4, an enlarged longitudinal section of the sleeve or nut shown in Fig. 2, and Fig. 5, a plan view of the nut or sleeve shown in Fig. 4.
Referring to the drawing, *a* represents the base of a lifting-jack, upon which is erected a cylinder or hollow standard *b* (see Fig. 2), over which is fitted to slide a cylinder *c* open at its lower end and closed at its upper end by a head or cap *d*, said outside cylinder being preferably made in two parts which are screwed together as represented in Figs. 2 and 3. The cylinder *c* is adapted to be raised and lowered by means of a threaded rod or screw *e* provided with a bevel gear *f*, which is adapted to be rotated by means of a handle *g*, pivoted on a shaft *h* and provided with a pallet bar *i*, which engages a suitable ratchet wheel (not shown) on the shaft *h*, which latter is also provided with a bevel pinion (not shown), which engages the bevel gear *f*. Inasmuch as the construction of the jack as thus far described is old and forms no part of the present invention, it is not deemed necessary to show the ratchet wheel and bevel pinion above referred to.

Provision is made for reducing the friction between the screw *e* and the cylinder *c*, which is accomplished by means of disks *m*, *n*, provided with raceways or grooves for the reception of substantially large balls *o* interposed between said disks.

In accordance with the present invention, the screw *e* is extended through a nut or sleeve 10 having internal screw-threads 12, which are engaged by the threads of the screw *e* and which may be double or single as desired. The sleeve or nut 10 is provided on its exterior with a tapered portion having screw-threads 15, which engage screw-threads 16 on a tapered portion 17 of the hollow standard or socket piece *b*, the tapered portion 17 being wider at its mouth.

Provision is made for reducing the internal diameter of the sleeve or nut 10 as the latter is turned into the tapered socket 17, and for this purpose, said sleeve is provided with one or more longitudinal slots or slits 20, and in the present instance, said sleeve or nut is shown as provided with a single slot or slit extended the length of the same. Provision is also made for regulating the adjustment of the sleeve or nut, which may be accomplished as herein shown, by means of a threaded collar 21, which engages a threaded circular end portion 22 of the sleeve or nut, and which collar is adapted to be adjusted on the sleeve or nut so as to be brought against the end of the socket piece 17 when the internal diameter of the sleeve or nut has been reduced the desired amount.

In Fig. 2, the tapered nut or sleeve 10 is shown in what may be regarded as its starting position, that is, the position it would occupy when the parts are new and not worn, and in Fig. 3, the said sleeve or nut 10 is shown as moved into its socket piece 17, so as to contract the sleeve or nut sufficiently to take up the wear on the threads of the screw e and nut 10 and thus restore the device to its original condition of usefulness.

The sleeve or nut 10 may be quickly removed from the socket piece, so that in case the internal threads of the sleeve or nut should become worn out, said sleeve or nut can be replaced by a new one in a short time, thereby avoiding loss of the use of the jack or device. In practice I may prefer to make the taper on the sleeve or nut about one inch to the foot.

I have herein shown the invention as embodied in a lifting jack, to which it is particularly well adapted, but I do not desire to limit my invention in this respect. The handle g of the jack is retained in its socket piece 25 by a flat spring 26 secured to the outside thereof and having a bent portion 27 which is extended through an opening in said socket piece. The nut 10 may be provided with slots 30 for the engagement of a spanner or other suitable tool.

Claims.

1. In a lifting jack, in combination, a hollow standard having a tapering screw-threaded portion on its interior forming a tapering socket, a nut or sleeve having a longitudinally extended slit and provided on its exterior with tapering screw-threads to engage the screw-threads of said socket and having screw-threads on its interior, a threaded rod or screw engaging the interior screw-threads of said sleeve or nut, and a threaded collar on said sleeve or nut adapted to engage the said socket piece, substantially as described.

2. In a lifting-jack, in combination, a hollow standard having a tapering screw-threaded portion on its interior forming a tapering socket, a nut or sleeve having a longitudinally extended slit and provided on its exterior with tapering screw-threads to engage the screw-threads of said socket and having screw-threads on its interior, a threaded rod or screw engaging the interior screw-threads of said sleeve or nut, and means to limit the movement of said sleeve or nut into its socket, substantially as described.

3. In a lifting-jack, in combination, a hollow standard having a tapering screw-threaded portion on its interior forming a tapering socket, a nut or sleeve having a longitudinally extended slit and provided on its exterior with tapering screw-threads to engage the screw-threads of said socket and having screw-threads on its interior, and a threaded rod or screw engaging the interior screw-threads of said sleeve or nut, substantially as described.

4. In combination, a socket piece provided on its interior with a screw-threaded tapering portion, a contractible nut or sleeve provided on its exterior with a tapered screw-threaded portion coöperating with said tapered socket and having screw-threads on its interior, said nut or sleeve having an externally threaded circular portion at its end of larger diameter a screw engaging the interior screw-threads of said sleeve or nut, and a threaded collar engaging said circular portion, substantially as described.

5. A sleeve or nut provided with a longitudinally extended slot or slit, and having screw-threads on its interior and provided with a threaded tapering portion on its exterior, and a threaded circular portion at its end of greater diameter, substantially as described.

In testimony whereof, I have signed my name to this specification in the presence of two subscribing witnesses.

FRANK L. GORMLEY.

Witnesses:
   JAS. H. CHURCHILL,
   J. MURPHY.